(12) United States Patent
Desmarais et al.

(10) Patent No.: US 6,959,946 B2
(45) Date of Patent: Nov. 1, 2005

(54) RETENTION FEATURE FOR AN ADJUSTABLE TURNING LOOP

(75) Inventors: Robert J. Desmarais, Lake Orion, MI (US); Richard Boelstler, Lake Orion, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 21 days.

(21) Appl. No.: 10/769,760

(22) Filed: Feb. 3, 2004

(65) Prior Publication Data

US 2005/0167970 A1 Aug. 4, 2005

(51) Int. Cl.[7] .............................................. B60R 22/20
(52) U.S. Cl. .................................................. 280/801.2
(58) Field of Search ........................ 280/801.2, 801.1, 280/808; 297/483

(56) References Cited

U.S. PATENT DOCUMENTS 6,135,499 A * 10/2000 Holzapfel et al. ....... 280/801.2

* cited by examiner

Primary Examiner—Faye M. Fleming
(74) Attorney, Agent, or Firm—Lonnie Drayer

(57) ABSTRACT

A vehicle restraint adjuster has a guide and a support for a vehicle restraint. The support is moveable along the guide. A securing member is provided to secure the guide to a vehicle body. The securing member is selectively actuable between a first position interfering with movement of the support past a predetermined point on the guide and a second position permitting movement of the support through the predetermined point.

15 Claims, 2 Drawing Sheets

RETENTION FEATURE FOR AN ADJUSTABLE TURNING LOOP

BACKGROUND OF THE INVENTION

This invention relates to an adjustable turning loop for a vehicle restraint system.

A safety belt for a vehicle restraint may include a shoulder belt that secures the upper body of a passenger to his seat in the event of an accident. The shoulder belt is supported above the shoulder of a seated passenger by a loop, commonly known as a web guide or D-ring. To accommodate varying shoulder heights of potential passengers, vehicle manufacturers may use an adjustable turning loop that permits the shoulder belt to be supported at different heights.

The adjustable turning loop may comprise a rail mounted to the B-pillar of a vehicle by bolts as well as a slide that acts as a carrier for the adjustable turning loop on the rail. The adjustable turning loop is raised or lowered by moving the slide up or down on the rail. To facilitate assembly of the adjustable turning loop into the vehicle, vehicle manufacturers may require the slide to be shipped already assembled on the rail. While the rail may have its bottom closed to prevent the slide from passing out this end, the other end of the rail is often left open to permit the vehicle manufacturer to later install cosmetic fittings to the assembly. Consequently, during shipping, the slide may slip out of the open end of the rail, requiring the vehicle manufacturer to reinstall the slide on the rail.

Manufacturers of adjustable turning loops have overcome this problem by placing cardboard inserts into the rail to secure the slide. However, inserting and subsequently removing this additional packaging is time consuming. This packaging thereby adds cost to the assembly.

Alternatively, some manufacturers have added stops to the open end. A pop rivet or other hard stop is added during the manufacturing process. This pop rivet or stop must be subsequently removed to install the cosmetic fittings. This additional operation also adds cost to the final assembly.

A need therefore exists for an adjustable turning loop assembly that retains the slide within the rail without additional cost and effort.

SUMMARY OF THE INVENTION

The invention comprises a vehicle restraint adjuster, such as an adjustable turning loop assembly. The adjustable turning loop assembly has a rail and a slide like other assemblies. In addition, a securing member, such as a bolt, secures the rail to a vehicle body. In contrast to existing assemblies, however, the inventive assembly uses the bolt as a stop.

The bolt has one position preventing movement of the slide past the bolt and another position permitting movement of the slide past the bolt. The inventive assembly is shipped to the manufacturer with the bolt in a position to prevent the slide from passing out of open end of the rail. When the assembly is received by the manufacturer, the bolt is pushed into the second position to allow the slide to travel over the bolt. In this way, the slide may be retained within the rail by using existing components and then quickly assembled into the vehicle without having to remove any packaging.

A unique feature of the assembly controls the position of the bolt on the rail. This control member has a first condition that maintains the bolt in an obstructing position and also has a second condition that permits the bolt to move to a non-obstructing position. The control feature may be part of a track surface of the rail. Accordingly, the control feature maintains the bolt above the track surface in the first condition and allows the bolt to pass beneath the track surface in the second condition. The control feature may control the position of the bolt within a hole of the track surface. The hole may have a shoulder to support the bolt in the non-obstructing position. The control member may support the bolt above the shoulder in the obstructing condition and then allow the bolt to rest on the shoulder in the non-obstructing position.

The invention also includes a method of manufacturing an adjustable turning loop. A slide is supported on a rail to move along a path of the rail. A bolt is inserted into a hole of the rail. The bolt is then selectively supported between a first position in the hole, which blocks the slide along the path of the rail and a second position in the hole, which unblocks the slide along the path.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
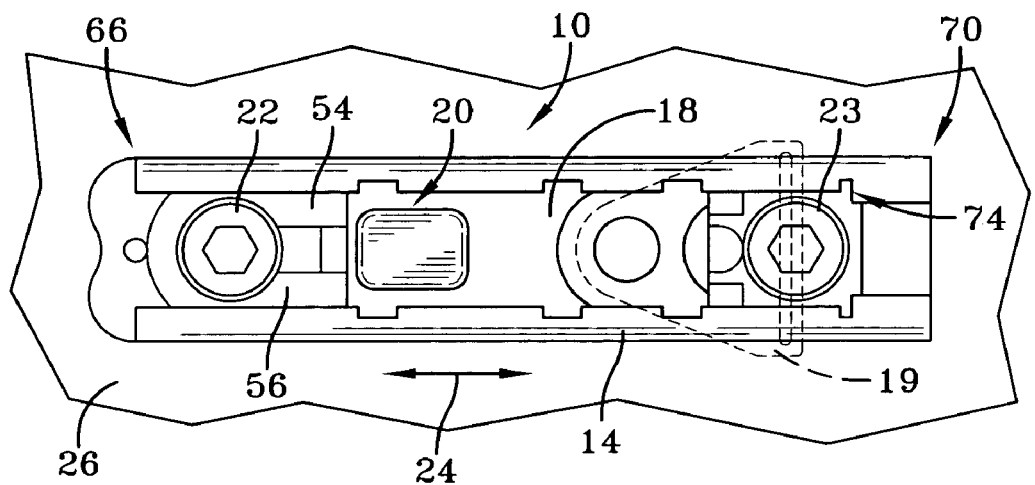
FIG. 1 illustrates the inventive vehicle restraint adjuster.

FIG. 1 illustrates vehicle restraint adjuster 10. As shown, vehicle restraint adjuster 10 comprises guide 14, a rail, which slideably receives slide 18, a support for a vehicle restraint such as a web guide for a safety belt. Web guide 19 is shown by dashed lines. Here, vehicle restraint adjuster 10 is shown schematically mounted to vehicle body 26, such as a B-pillar of an automobile. Vehicle restraint adjuster 10 is mounted to vehicle body 26 by securing members 22, 23, here bolts.

As known, by actuation of support actuator 20, slide 18 may move along path 24 of guide 14. Path 24 is shown here horizontally for illustration purposes only. In a vehicle, path 24 is generally vertical. Slide 18 slides on track surface 54 of track 56. Track 56 may be a plastic insert attached to guide 14, which has a coefficient of friction lower than guide 14. Track 56 is installed between slide 18 and guide 14. Movement of slide 18 allows for adjustment of, say, the height of web guide 19, which is mounted to support 18. These features of vehicle restraint adjuster 10 are well known.

Typically, vehicle restraint adjuster 10 has end portion 66 and end portion 70. End portion 66 is open. Without a stop, slide 18 may travel along path 24 past end portion 66. End portion 70 is typically provided with stop 74, which prevents slide 18 from sliding out of end portion 70. During shipment, slide 18 may become disassembled from vehicle restraint adjuster 10 by passing out of end portion 66. In the past, manufacturers have prevented this disassembly by placing a hard stop, such as a pop rivet, at end portion 66. Such a metal rivet requires labor to install as well as additional time to remove. Manufacturers prefer to keep end portion 66 open so as to allow the later installation of cosmetic end fittings at end portion 66.

Figure 2:
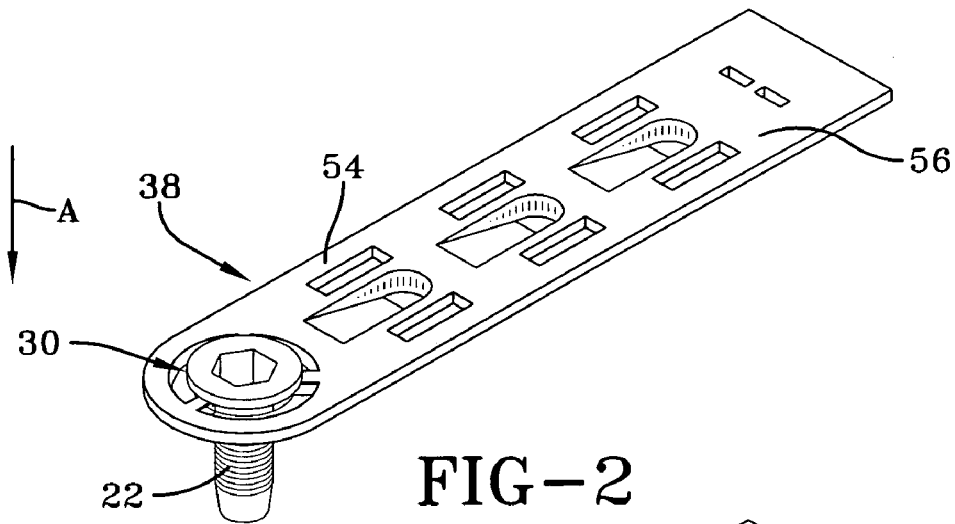
FIG. 2 illustrates a securing member of the inventive vehicle restraint adjuster in a blocking position.
Figure 3:
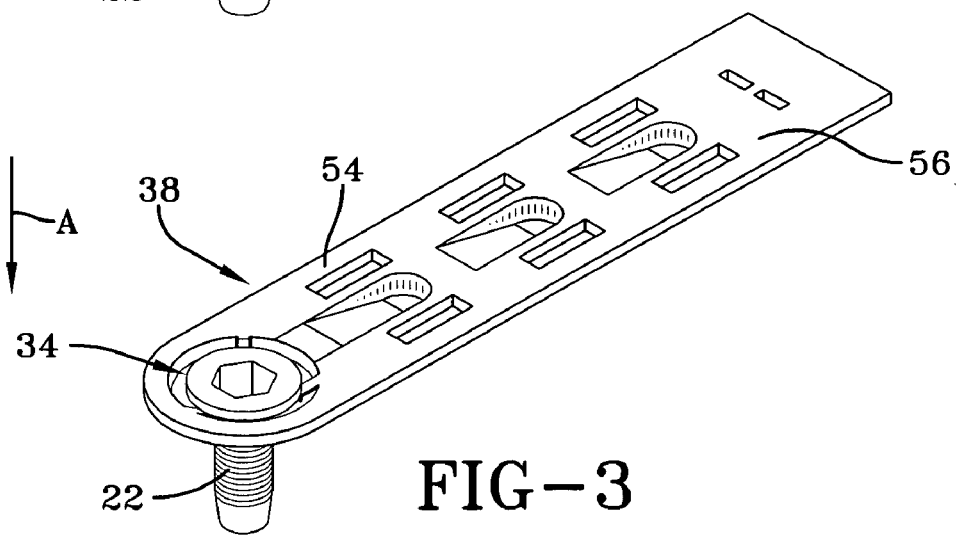
FIG. 3 illustrates the securing member of FIG. 2 in an unblocked position.

In contrast to other vehicle restraint adjusters, inventive vehicle restraint adjuster 10 has control feature 42 (shown in FIG. 4), which permits securing member 22 near end portion 66 to have two positions. FIG. 2 and FIG. 3 show securing member 22 in both positions. As shown in FIG. 2, for purposes of shipping vehicle restraint adjuster 10 to a vehicle manufacturer, securing member 22 is in first position 30, which is raised above track surface 54. Securing member 22 is raised sufficiently high enough to interfere and block movement of slide 18 on rail 14. Because securing member 22 is raised above track surface 54, securing member 22 acts as a stop for slide 18, which rides on track surface 54.

Following shipment of vehicle restraint adjuster 10, securing member 22 is pressed in the direction of arrow A so that securing member 22 is now beneath track surface 54. In this way, securing member 22 serves as a stop for slide 18 during shipment only. Securing member 22 may then easily be pushed into second position 34 so as to no longer obstruct movement of slide 18 on guide 14 during normal operation.

Figure 4:
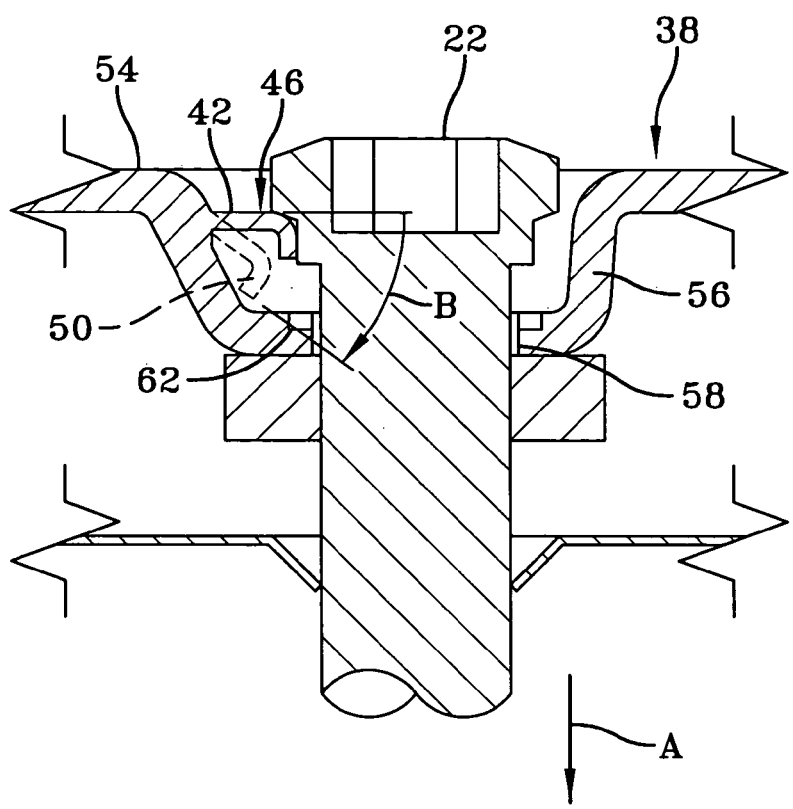
FIG. 4 illustrates a cross-sectional view of the securing member of FIG. 2, highlighting control member for selectively controlling the position of the securing member.
Figure 5:
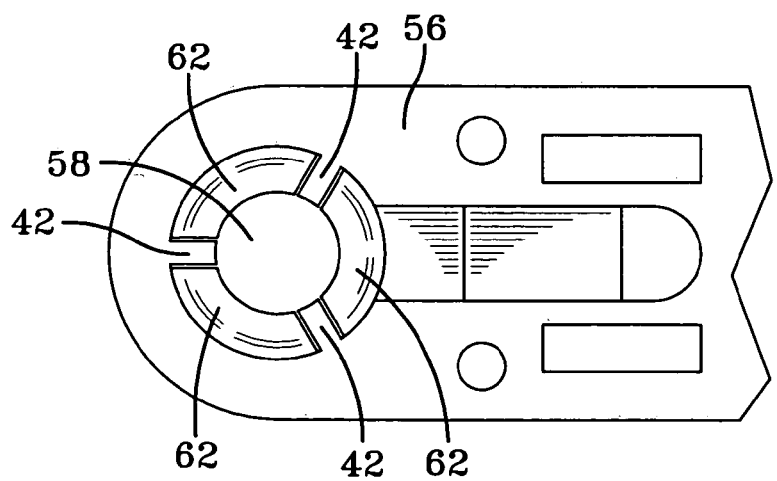
FIG. 5 illustrates an overhead view of the control member of FIG. 4.

FIGS. 4 and 5 illustrates how control feature 42 controls the position of securing member 22 relative to track surface 54. As shown in FIG. 4, control feature 42 comprises a finger having two conditions. First condition 46 supports securing member 22 in first position 30, which obstructs movement of slide 18 past predetermined point 38, the edge of securing member 22. By pressing securing member 22 in the direction of arrow A, control feature 42 is deformed to second condition 50 (shown by dashed lines) in the direction of arrow B so as to permit securing member 22 to rest on shoulder 62 of track 56. Securing member 22 is then no longer in a position to obstruct movement of slide 18 on track surface 54 as shown in FIG. 3. As shown in FIG. 5, three control features or fingers 42 may ring hole 58 so as to provide support to securing member 22 at three different points.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A vehicle restraint adjuster comprising:
   a guide having a coefficient of friction;
   a support for a vehicle restraint, said support movable along said guide;
   a securing member for securing said guide to a vehicle body, said securing member selectively actuable between a first position interfering with movement of said support through a predetermined point on said guide and a second position permitting movement of said support through said predetermined point;
   a track surface disposed between said support and said guide, said track surface having a lower coefficient of friction than the coefficient of friction of said guide; and
   a control feature for selectively actuating said securing member between said first position and said second position, said control feature comprising a control member having a first condition for maintaining said securing member at said first position and having a second condition for permitting said securing member to move to said second position.

2. The vehicle restraint adjuster of 1 wherein said track surface has said control member incorporated therein.

3. The vehicle restraint adjuster of claim 2 wherein said control member maintains said securing member above said track surface in said first condition and allows said securing member to pass beneath said track surface in said second condition.

4. The vehicle restraint adjuster of claim 3 wherein said track surface has a hole therein to receive said securing member, said control member controlling movement of said securing member received in said hole between said first position and said second position.

5. The vehicle restraint adjuster of claim 4 further comprising a shoulder for supporting said securing member in said hole, said control member in said first condition supporting said securing member above said shoulder and said control member in said second condition allowing said securing member to rest on said shoulder.

6. The vehicle restraint adjuster of claim 1 wherein said securing member comprises a bolt.

7. The vehicle restraint adjuster of claim 1 wherein said guide comprises a rail.

8. The vehicle restraint adjuster of claim 7 wherein said support comprises a slide, slideably received on said rail.

9. The vehicle restraint adjuster of claim 1 further comprising a support actuator for selectively locking and unlocking said support.

10. A vehicle restraint adjuster comprising:
    a rail having a coefficient of friction;
    a slide for supporting a vehicle restraint, said slide slideably movable along said rail;
    a track surface disposed between said slide and said rail, said track surface having a lower coefficient of friction than said rail;
    a securing member for securing said rail to a vehicle body, said securing member selectively actuable between a first position interfering with movement of said slide through a predetermined point on said guide and a second position permitting movement of said slide through said predetermined point; and
    a control feature for selecting actuating said securing member between said first position and said second position, said control feature comprising a control member having a first condition for maintaining said securing member at said first position and having a second condition for permitting said securing member to move to said second position.

11. The vehicle restraint adjuster of 10 wherein said track surface has said control member incorporated therein.

12. The vehicle restraint adjuster of claim 11 wherein said control member maintains said securing member above said track surface in said first condition and allows said securing member to pass beneath said track surface in said second condition.

13. The vehicle restraint adjuster of claim 12 wherein said track surface has a hole therein to receive said securing member, said control member controlling movement of said securing member received in said hole between said first position and said second position.

14. The vehicle restraint adjuster of claim 13 further comprising a shoulder for supporting said securing member in said hole, said control member in said first condition supporting said securing member above said shoulder and said control member in said second condition allowing said securing member to rest on said shoulder.

15. A method of manufacturing a vehicle restraint adjuster, comprising the steps of:
disposing a slide on a rail to move along the rail, the rail having a hole therein for receiving a securing member for securing the rail to a vehicle body;
inserting the securing member into the hole; and
selectively supporting the securing member in either a first position in the hole blocking movement of the slide along the rail or a second position in the hole that does not block movement of the slide along the rail.

* * * * *